US012608403B2

(12) United States Patent
Gune et al.

(10) Patent No.: US 12,608,403 B2
(45) Date of Patent: Apr. 21, 2026

(54) EXTRACTION MACHINE LEARNING FRAMEWORK

(71) Applicant: Schlumberger Technology Corporation, Sugar Land, TX (US)

(72) Inventors: Omkar Anil Gune, Pune (IN); Purnaprajna Raghavendra Mangsuli, Pune (IN); Michael Antony Cleminson, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 263 days.

(21) Appl. No.: 18/539,424

(22) Filed: Dec. 14, 2023

(65) Prior Publication Data

US 2024/0202216 A1     Jun. 20, 2024

Related U.S. Application Data

(60) Provisional application No. 63/387,388, filed on Dec. 14, 2022.

(51) Int. Cl.
*G06F 16/20* (2019.01)
*G06F 16/22* (2019.01)
*G06F 16/28* (2019.01)

(52) U.S. Cl.
CPC ........ *G06F 16/285* (2019.01); *G06F 16/2237* (2019.01)

(58) Field of Classification Search
CPC ............................ G06F 16/285; G06F 16/2237
See application file for complete search history.

(56) References Cited

U.S. PATENT DOCUMENTS

| | | | | |
|---|---|---|---|---|
| 11,392,607 B2 | 7/2022 | Hoang et al. | | |
| 11,734,937 B1 * | 8/2023 | Pushkin | .............. | G06F 18/2155 |
| | | | | 706/12 |
| 12,061,675 B1 * | 8/2024 | Bhave | ............... | G06F 18/23213 |
| 2006/0024653 A1 * | 2/2006 | Battagin | ............... | G06F 16/283 |
| | | | | 434/350 |
| 2017/0330109 A1 * | 11/2017 | Maughan | ................. | G06N 5/04 |
| 2019/0318198 A1 | 10/2019 | Griffin et al. | | |

(Continued)

FOREIGN PATENT DOCUMENTS

| | | | |
|---|---|---|---|
| CN | 113255501 A | | 8/2021 |
| CN | 115757811 A | * | 3/2023 |
| WO | 2022015594 A1 | | 1/2022 |

OTHER PUBLICATIONS

Article entitled "SeLab: Semantic Labeling with BERT", by Trabelsi et al., dated Sep. 23, 2021 (Year: 2021).*

(Continued)

*Primary Examiner* — Mahesh H Dwivedi
(74) *Attorney, Agent, or Firm* — Kyle R. Miiller

(57) ABSTRACT

A method implements extraction using a machine learning framework. The method includes extracting a set of features from a table. The method further includes applying a feature extraction model to the set of features to generate a pseudo sentence. The method further includes applying a classifier model to the pseudo sentence to generate a label prediction for the table. The classifier model is trained with an augmented training pseudo sentence created by one or more of sampling and shuffling. The method further includes updating a label of the table with the label prediction.

18 Claims, 13 Drawing Sheets

(56) References Cited

U.S. PATENT DOCUMENTS

| | | | | |
|---|---|---|---|---|
| 2020/0097541 | A1* | 3/2020 | Christianson | ....... G06F 16/3323 |
| 2021/0174196 | A1* | 6/2021 | Desmond | ................. G06N 3/08 |
| 2021/0383249 | A1* | 12/2021 | Goyal | .................... G06F 16/36 |
| 2021/0397631 | A1 | 12/2021 | Rout et al. | |
| 2022/0391719 | A1* | 12/2022 | Mansour | .................. G06N 5/04 |
| 2023/0409806 | A1* | 12/2023 | Dash | .................... G06F 40/284 |

OTHER PUBLICATIONS

Article entitled "Partially Shuffling the Training Data to Improve Language Models", by Press, dated Mar. 12, 2019 (Year: 2019).*
Article entitled "Semantic Labeling Using a Deep Contextualized Language Model", by Trabelsi et al., dated Oct. 30, 2020 (Year: 2020).*
Article entitled "StruBERT: Structure-aware BERT for Table Search and Matching", by Trabelsi et al., dated Apr. 29, 2022 (Year: 2022).*
Search Report and Written Opinion of International Patent Application No. PCT/US2023/083952 dated on Apr. 5, 2024, 09 pages.
Reimers et al., "Sentence Bert: Sentence Embeddings using Siamese Bert-Networks", Proceedings of the 2019 Conference on Empirical Methods in Natural Language Processing and the 9th International Joint Conference on Natural Language Processing, Nov. 3-7, 2019, pp. 3982-3992.
Gune et al., "Generalized Zero-shot Learning using Open Set Recognition", BMVC, 2019, 13 pages.

* cited by examiner

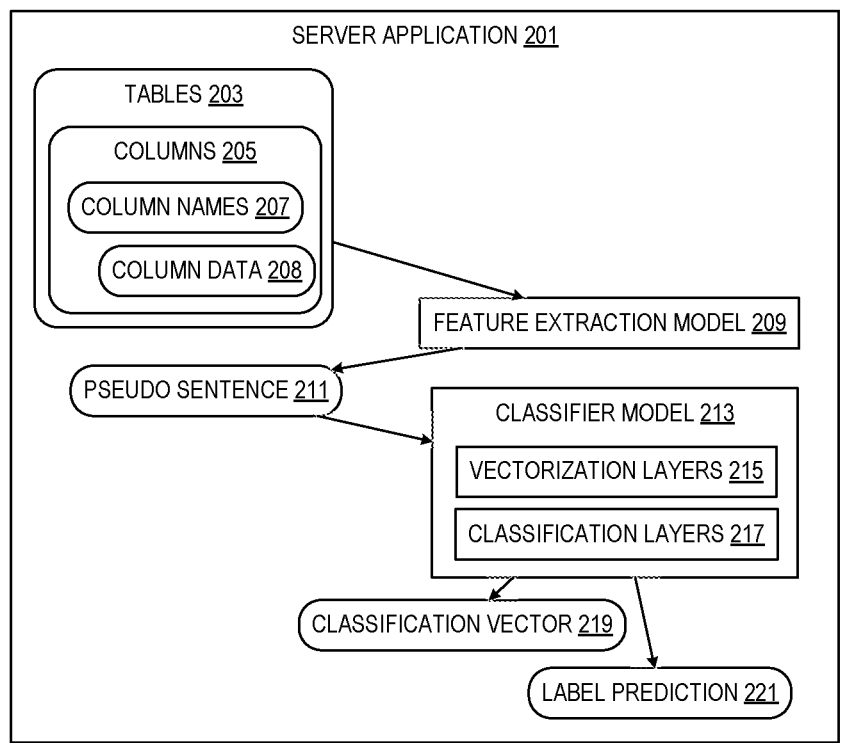
*FIG. 2.1*
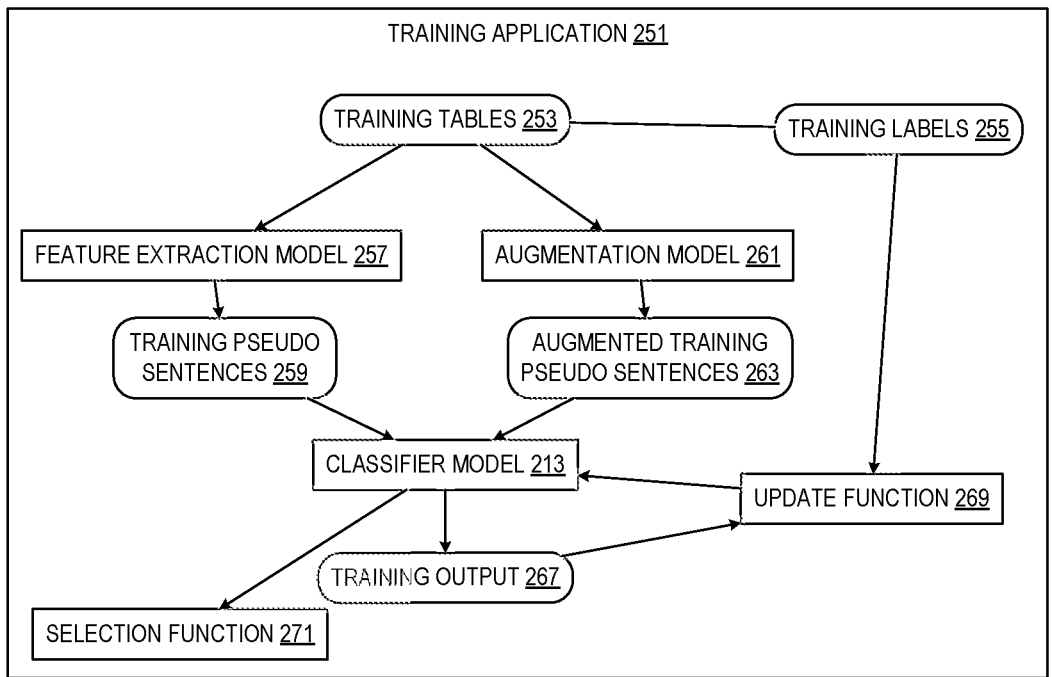
*FIG. 2.2*

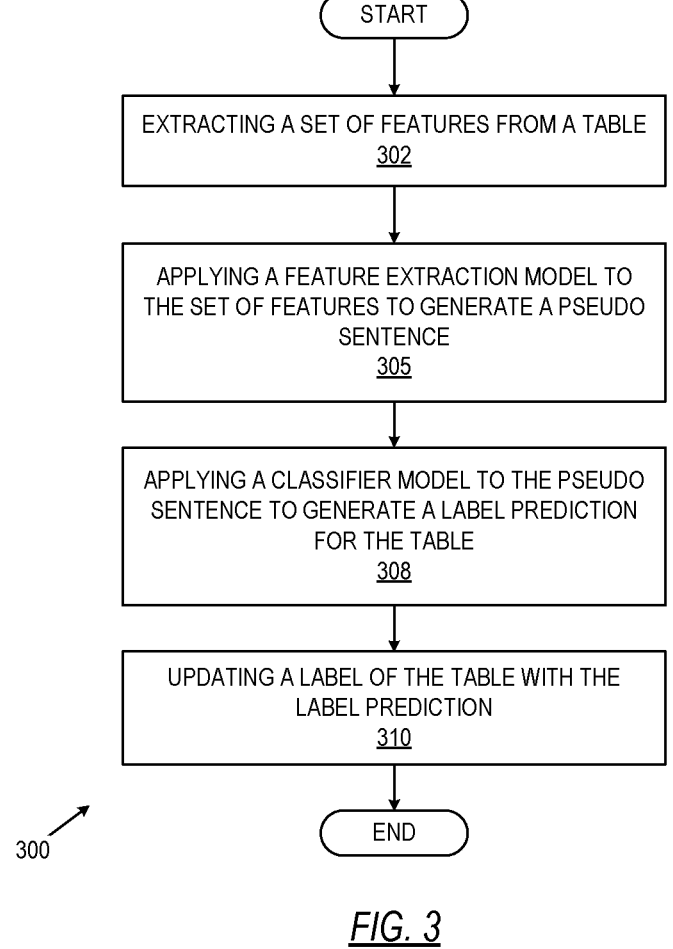
START
EXTRACTING A SET OF FEATURES FROM A TABLE
302
APPLYING A FEATURE EXTRACTION MODEL TO
THE SET OF FEATURES TO GENERATE A PSEUDO
SENTENCE
305
APPLYING A CLASSIFIER MODEL TO THE PSEUDO
SENTENCE TO GENERATE A LABEL PREDICTION
FOR THE TABLE
308
UPDATING A LABEL OF THE TABLE WITH THE
LABEL PREDICTION
310
END
300
_FIG. 3_

Figure 4.1:
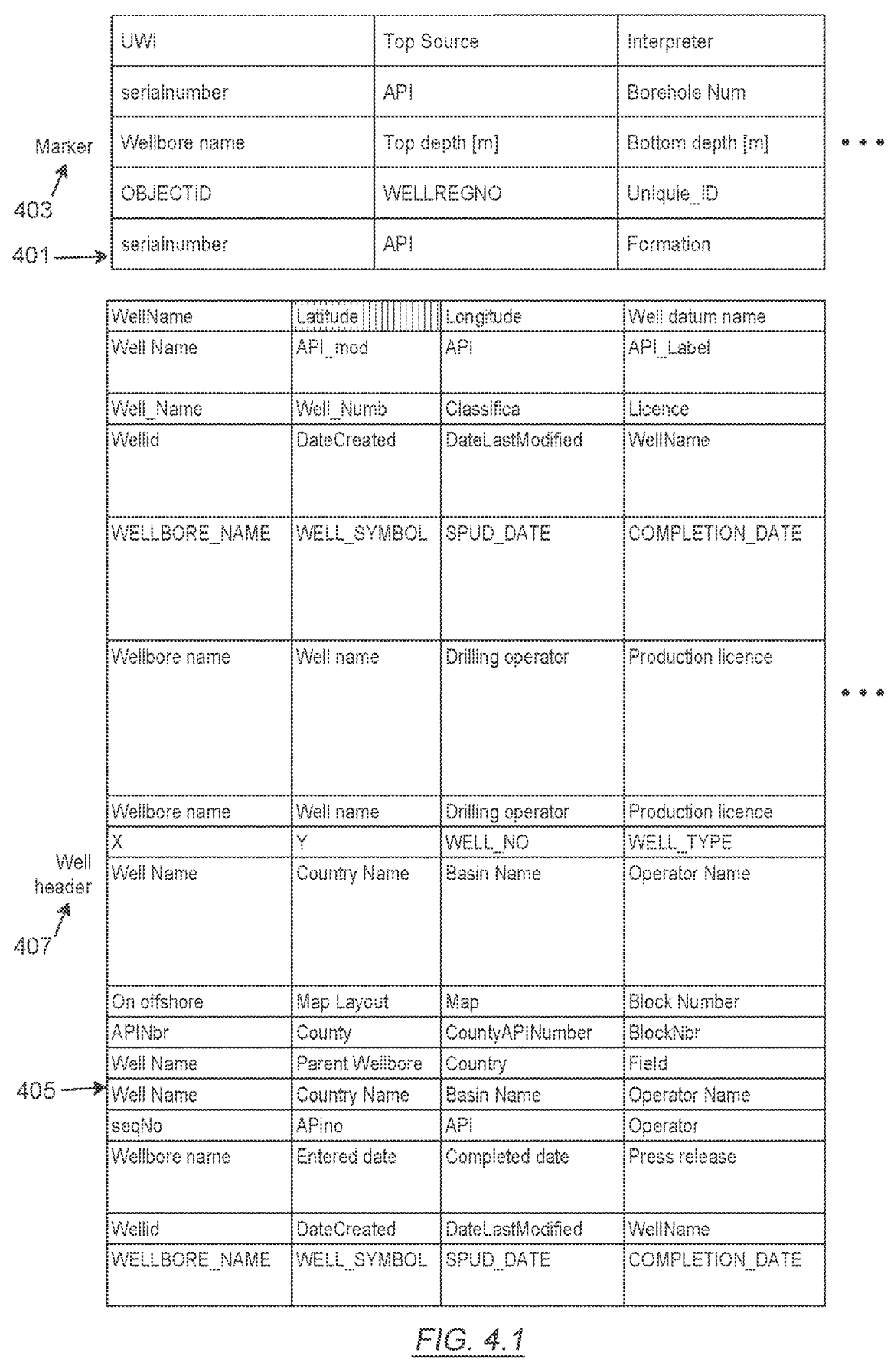

| UWI | Top Source | Interpreter | |
|---|---|---|---|
| serialnumber | API | Borehole Num | |
| Wellbore name | Top depth [m] | Bottom depth [m] | • • • |
| OBJECTID | WELLREGNO | Uniquie_ID | |
| serialnumber | API | Formation | |

Marker 403

401 →

| WellName | Latitude | Longitude | Well datum name | |
|---|---|---|---|---|
| Well Name | API_mod | API | API_Label | |
| Well_Name | Well_Numb | Classifica | Licence | |
| Wellid | DateCreated | DateLastModified | WellName | |
| WELLBORE_NAME | WELL_SYMBOL | SPUD_DATE | COMPLETION_DATE | |
| Wellbore name | Well name | Drilling operator | Production licence | • • • |
| Wellbore name | Well name | Drilling operator | Production licence | |
| X | Y | WELL_NO | WELL_TYPE | |
| Well Name | Country Name | Basin Name | Operator Name | |
| On offshore | Map Layout | Map | Block Number | |
| APINbr | County | CountyAPINumber | BlockNbr | |
| Well Name | Parent Wellbore | Country | Field | |
| Well Name | Country Name | Basin Name | Operator Name | |
| seqNo | APino | API | Operator | |
| Wellbore name | Entered date | Completed date | Press release | |
| Wellid | DateCreated | DateLastModified | WellName | |
| WELLBORE_NAME | WELL_SYMBOL | SPUD_DATE | COMPLETION_DATE | |

Well header 407

Figure 4.2:
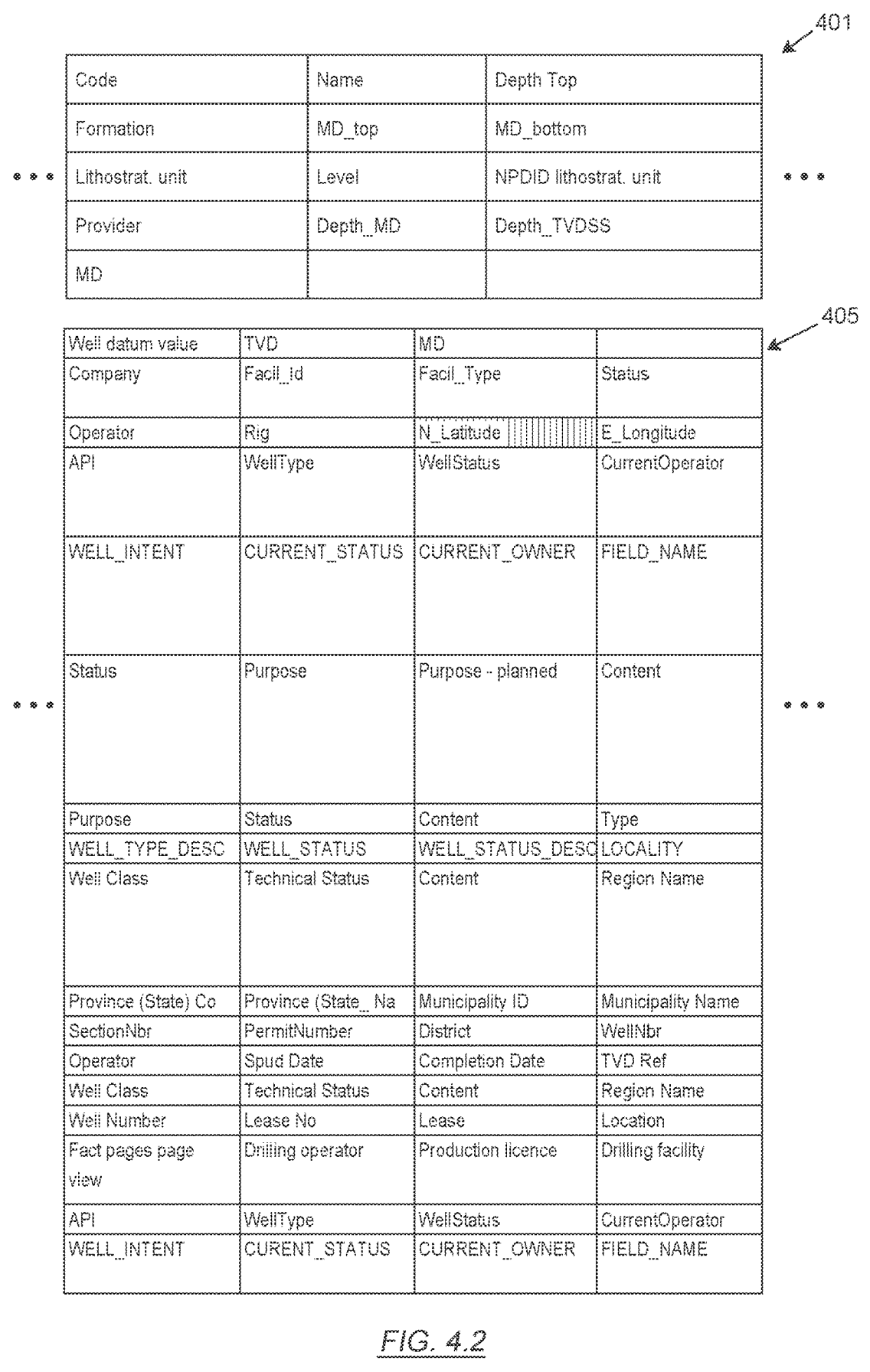

| Code | Name | Depth Top |
|---|---|---|
| Formation | MD_top | MD_bottom |
| Lithostrat. unit | Level | NPDID lithostrat. unit |
| Provider | Depth_MD | Depth_TVDSS |
| MD | | |

• • •                                                                • • •

405

| Well datum value | TVD | MD | |
|---|---|---|---|
| Company | Facil_id | Facil_Type | Status |
| Operator | Rig | N_Latitude | E_Longitude |
| API | WellType | WellStatus | CurrentOperator |
| WELL_INTENT | CURRENT_STATUS | CURRENT_OWNER | FIELD_NAME |
| Status | Purpose | Purpose - planned | Content |
| Purpose | Status | Content | Type |
| WELL_TYPE_DESC | WELL_STATUS | WELL_STATUS_DESC | LOCALITY |
| Well Class | Technical Status | Content | Region Name |
| Province (State) Co | Province (State_ Na | Municipality ID | Municipality Name |
| SectionNbr | PermitNumber | District | WellNbr |
| Operator | Spud Date | Completion Date | TVD Ref |
| Well Class | Technical Status | Content | Region Name |
| Well Number | Lease No | Lease | Location |
| Fact pages page view | Drilling operator | Production licence | Drilling facility |
| API | WellType | WellStatus | CurrentOperator |
| WELL_INTENT | CURENT_STATUS | CURRENT_OWNER | FIELD_NAME |

Figure 4.3:
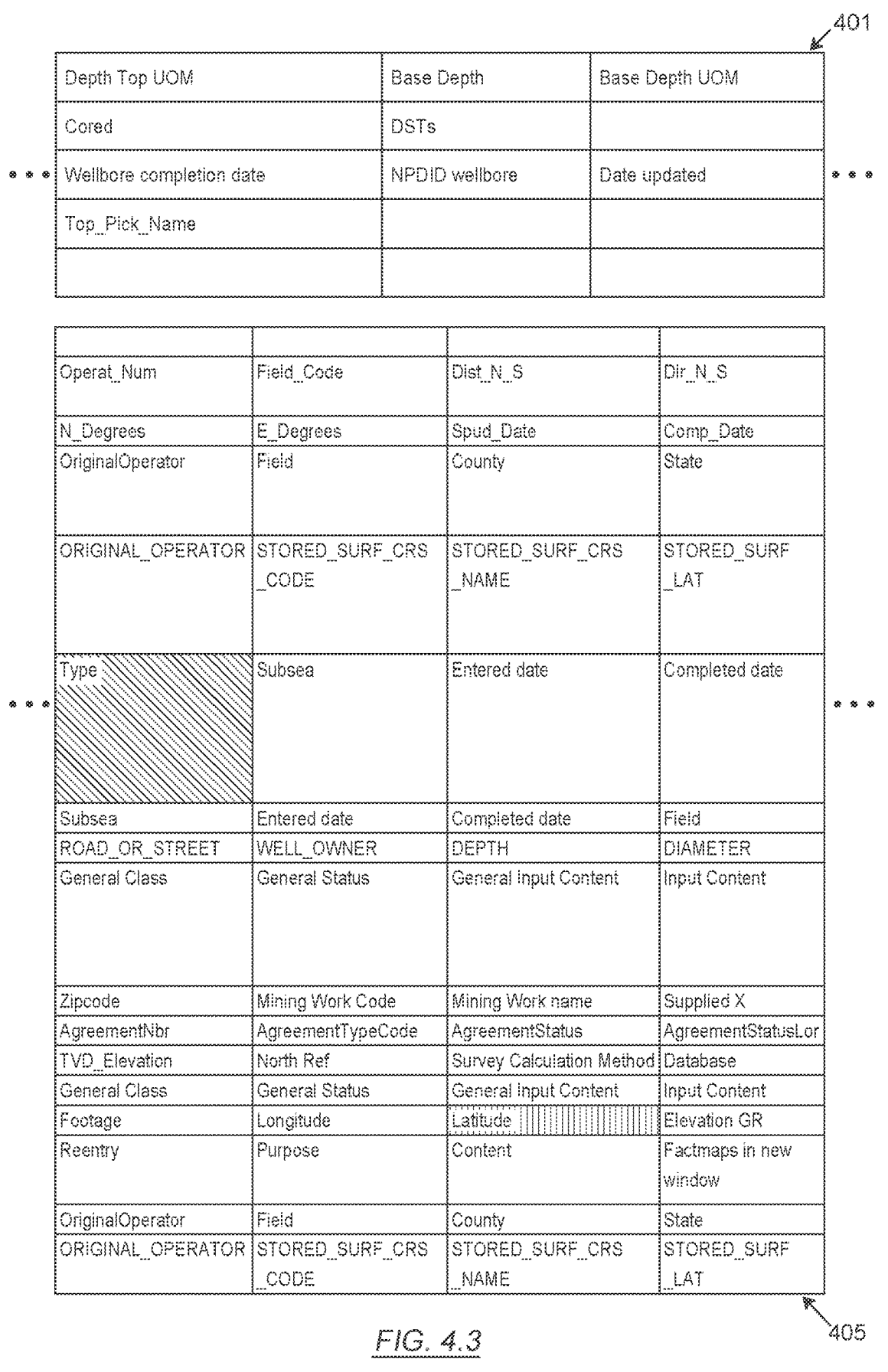

| Depth Top UOM | Base Depth | Base Depth UOM |
|---|---|---|
| Cored | DSTs | |
| Wellbore completion date | NPDID wellbore | Date updated |
| Top_Pick_Name | | |
| | | |

| | | | |
|---|---|---|---|
| Operat_Num | Field_Code | Dist_N_S | Dir_N_S |
| N_Degrees | E_Degrees | Spud_Date | Comp_Date |
| OriginalOperator | Field | County | State |
| ORIGINAL_OPERATOR | STORED_SURF_CRS _CODE | STORED_SURF_CRS _NAME | STORED_SURF _LAT |
| Type | Subsea | Entered date | Completed date |
| Subsea | Entered date | Completed date | Field |
| ROAD_OR_STREET | WELL_OWNER | DEPTH | DIAMETER |
| General Class | General Status | General Input Content | Input Content |
| Zipcode | Mining Work Code | Mining Work name | Supplied X |
| AgreementNbr | AgreementTypeCode | AgreementStatus | AgreementStatusLor |
| TVD_Elevation | North Ref | Survey Calculation Method | Database |
| General Class | General Status | General Input Content | Input Content |
| Footage | Longitude | Latitude | Elevation GR |
| Reentry | Purpose | Content | Factmaps in new window |
| OriginalOperator | Field | County | State |
| ORIGINAL_OPERATOR | STORED_SURF_CRS _CODE | STORED_SURF_CRS _NAME | STORED_SURF _LAT |

Figure 4.4:
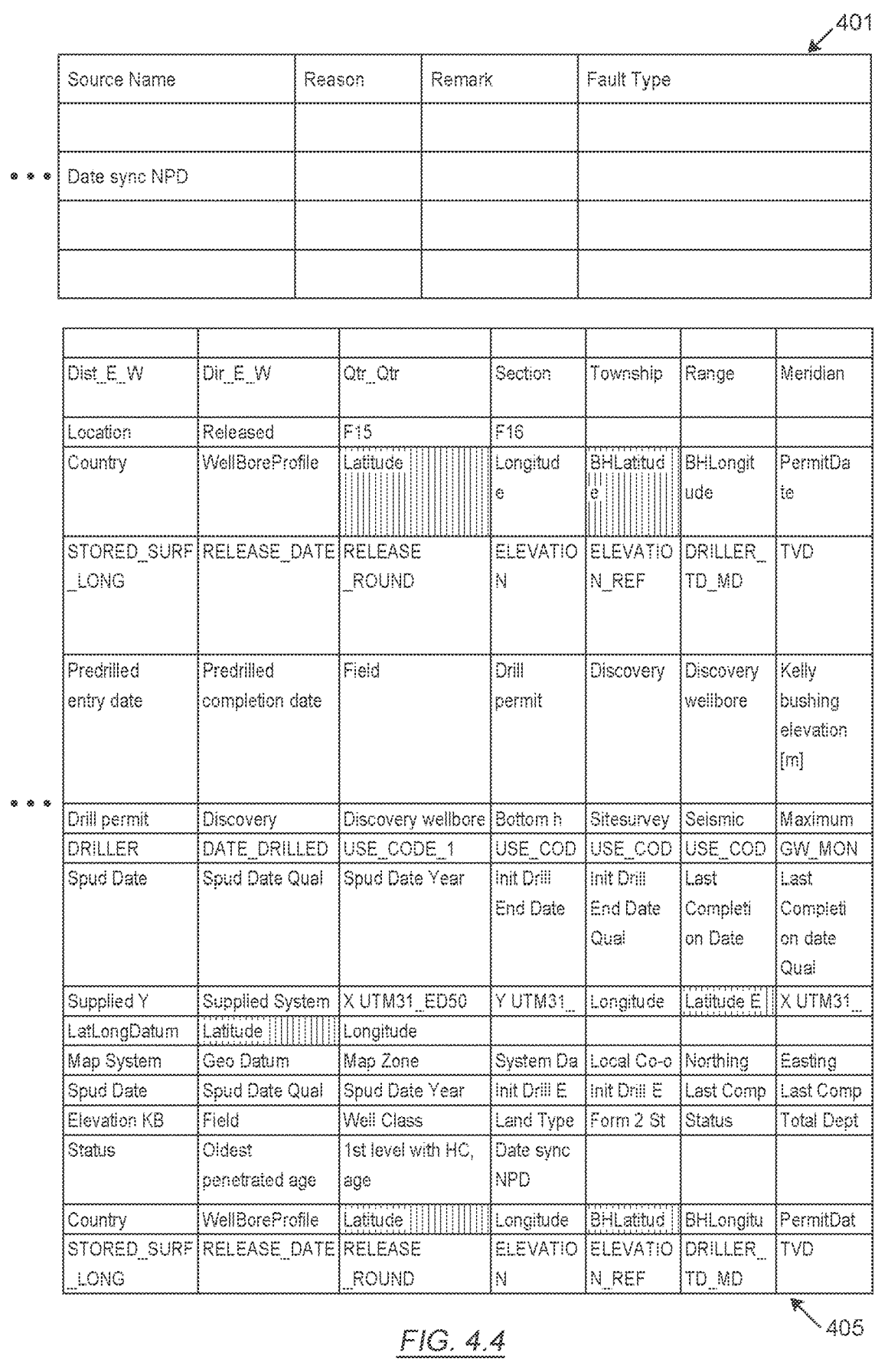

| Source Name | Reason | Remark | Fault Type |
|---|---|---|---|
|  |  |  |  |
| Date sync NPD |  |  |  |
|  |  |  |  |
|  |  |  |  |

• • •

| Dist_E_W | Dir_E_W | Qtr_Qtr | Section | Township | Range | Meridian |
|---|---|---|---|---|---|---|
| Location | Released | F15 | F16 |  |  |  |
| Country | WellBoreProfile | Latitude | Longitude | BHLatitude | BHLongitude | PermitDate |
| STORED_SURF_LONG | RELEASE_DATE | RELEASE_ROUND | ELEVATION | ELEVATION_REF | DRILLER_TD_MD | TVD |
| Predrilled entry date | Predrilled completion date | Field | Drill permit | Discovery | Discovery wellbore | Kelly bushing elevation [m] |
| Drill permit | Discovery | Discovery wellbore | Bottom h | Sitesurvey | Seismic | Maximum |
| DRILLER | DATE_DRILLED | USE_CODE_1 | USE_COD | USE_COD | USE_COD | GW_MON |
| Spud Date | Spud Date Qual | Spud Date Year | Init Drill End Date | Init Drill End Date Qual | Last Completion Date | Last Completion date Qual |
| Supplied Y | Supplied System | X UTM31_ED50 | Y UTM31_ | Longitude | Latitude E | X UTM31_ |
| LatLongDatum | Latitude | Longitude |  |  |  |  |
| Map System | Geo Datum | Map Zone | System Da | Local Co-o | Northing | Easting |
| Spud Date | Spud Date Qual | Spud Date Year | Init Drill E | Init Drill E | Last Comp | Last Comp |
| Elevation KB | Field | Well Class | Land Type | Form 2 St | Status | Total Dept |
| Status | Oldest penetrated age | 1st level with HC, age | Date sync NPD |  |  |  |
| Country | WellBoreProfile | Latitude | Longitude | BHLatitud | BHLongitu | PermitDat |
| STORED_SURF_LONG | RELEASE_DATE | RELEASE_ROUND | ELEVATION | ELEVATION_REF | DRILLER_TD_MD | TVD |

Data Type Detection

RESET DASHBOARD

How to use this app?

This is a test app for data type classification from tabular files (csv/xlsx).

Please upload a single file or zip file containing multiple csv/xlsx files.

Use "CLASSIFY DATA" option to classify the data. Please wait as the classification may take a longer time.

Use "DOWNLOAD RESULTS" option to download the classified data. File will be downloaded and kept in different directories for the data types.

Use "RETRAIN" option to retrain ML model based on corrected labels in the table. (Currently retraining is not supported.)

Use "RESET DASHBOARD" in case you face any difficulties in using app.

Use textbox to enter new data type for which you want to train the model. (Currently training is not supported.)

Hover over the file name in the table to view the headers of the csv/xlsx.

Upload ZIP file

CLASSIFY DATA

DOWNLOAD RESULTS

RETRAIN

Enter new data type below
(one at a time) ⟋ 702

SUBMIT

Supported data types are:
Well header, Marker, zone, trajectory

Classified Data

| ⬦Filename | ⬦Predicted_Label | ⬦Filename |
|---|---|---|
| zip_marker.xlsx | Marker | ▶ |
| zip_well2.csv | Well header | ▶ |
| zip_well1.xlsx | Well header | ▶ |

Classified Data

| Filename | Predicted_Label | Corrected_Label |
|---|---|---|
| marker_20201217103108.xlsx | Marker | Well header ✕ |
| Marker_DOV_Aishwarya6-Z.xls | Marker | |
| Headers.csv | Marker | |
| WELL_HEADER.xls | Well header | |
| Marker_DOV_Aishwarya3.xls | Marker | |
| UKOGD%2FINFO%2Fwell_header.slsx | Well header | |
| Marker_DOV_Aishwarya2.xls | Marker | |
| Marker_DOV_Aishwarya6.xls | Marker | |
| Headers.xlsx | Well header | |
| Well_Header_wke.csv | Marker | |

⊖ Samples of old data type

⊗ Samples of pseudo-open (pseudo-new) class: generated using ML model

⊘ Sample of old data type (but incorrectly labeled as new data type sample)

⊘ Samples of new data type (correctly labeled)

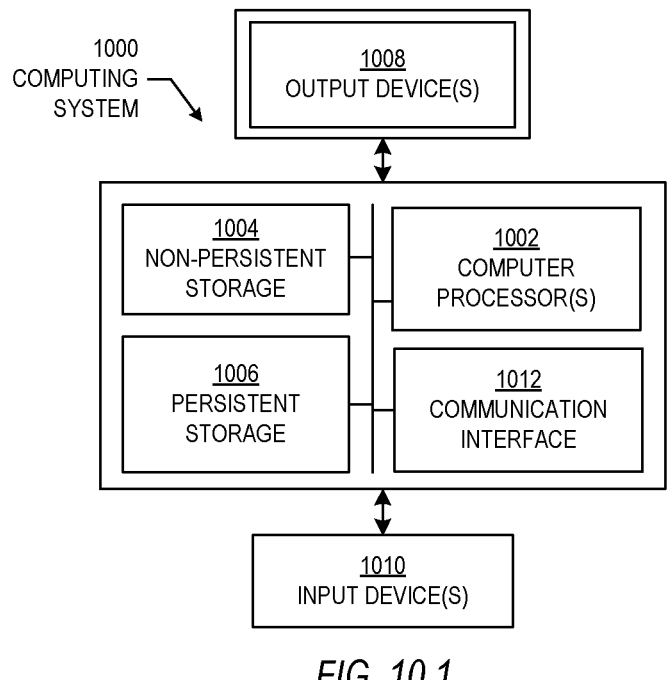
1000
COMPUTING
SYSTEM
1008
OUTPUT DEVICE(S)
1004
NON-PERSISTENT
STORAGE
1002
COMPUTER
PROCESSOR(S)
1006
PERSISTENT
STORAGE
1012
COMMUNICATION
INTERFACE
1010
INPUT DEVICE(S)
*FIG. 10.1*
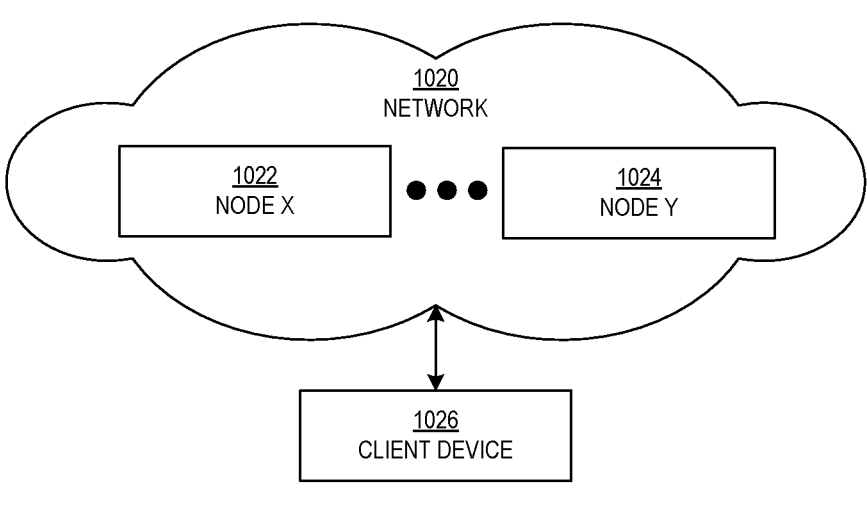
1020
NETWORK
1022
NODE X
1024
NODE Y
1026
CLIENT DEVICE
*FIG. 10.2*

EXTRACTION MACHINE LEARNING FRAMEWORK

CROSS REFERENCE TO RELATED APPLICATIONS

This application claims the benefit of U.S. Provisional Application 63/387,388, filed Dec. 14, 2022, which is incorporated by reference herein.

BACKGROUND

While a considerable number of documents, such as reports, are present and created in big data systems, tabular based data using formats (e.g., the xlsx, csv, json, etc.) form a substantial portion of the data used by big data systems. Many times, in a cloud-based system, the separation of such tabular data may be based on the type of data present in the tabular format. Data separation for data ingestion, especially when done at large scale, faces multiple challenges. Manual separation of such big data may be time consuming. The heterogeneous nature of data of the same type but coming from different sources utilize domain expertise in understanding and separating the data. On the other hand, artificial intelligence (AI) and natural language processing (NLP) based system for data processing and separation often uses large data to train machine learning models. With introduction of a new data type, natural language processing based machine learning model uses retraining given the large number of labeled data for new data type. The retraining process is again a time-consuming task. Identifying the best performing model is a challenging task considering erroneous labeling and hence model retraining.

SUMMARY

In general, in one or more aspects, the disclosure relates to a method that implements extraction using a machine learning framework. The method includes extracting a set of features from a table. The method further includes applying a feature extraction model to the set of features to generate a pseudo sentence. The method further includes applying a classifier model to the pseudo sentence to generate a label prediction for the table. The classifier model is trained with an augmented training pseudo sentence created by one or more of sampling and shuffling. The method further includes updating a label of the table with the label prediction.

Other aspects of one or more embodiments of the disclosure will be apparent from the following description and the appended claims.

BRIEF DESCRIPTION OF DRAWINGS

FIG. 1, FIG. 2.1, and FIG. 2.2 show diagrams in accordance with one or more embodiments.

FIG. 3 shows a method in accordance with one or more embodiments.

FIG. 4.1, FIG. 4.2, FIG. 4.3, and FIG. 4.4 show an example of samples in accordance with one or more embodiments.

FIG. 7 shows a user interface in accordance with one or more embodiments.

FIG. 8 shows a user interface in accordance with one or more embodiments.

FIGS. 10.1 and 10.2 show a computing system in accordance with one or more embodiments of the disclosure.

Similar elements in the various figures are denoted by similar names and reference numerals. The features and elements described in one figure may extend to similarly named features and elements in different figures.

DETAILED DESCRIPTION

Embodiments of the disclosure implement a machine learning framework for extraction to address the challenges identified above. The machine learning framework trains a classifier model to label tables of data to identify the data types of the tables of data. As an example, the classifier model extracts column names or column data from a table and then predicts the label of the table that corresponds to the data type of the table.

The amount of training data for the classifier model may be increased. Increasing the amount of training data may be done by sampling and shuffling the order of the features extracted from the columns.

The classifier model may be retrained with additional training data. The accuracy of the retrained classifier model may be compared to the accuracy of the previous model. The accuracy may be generated using a gold standard dataset that was held out and not used during training. The model with the highest accuracy may be deployed as the latest version of the classifier model.

Figure 1:
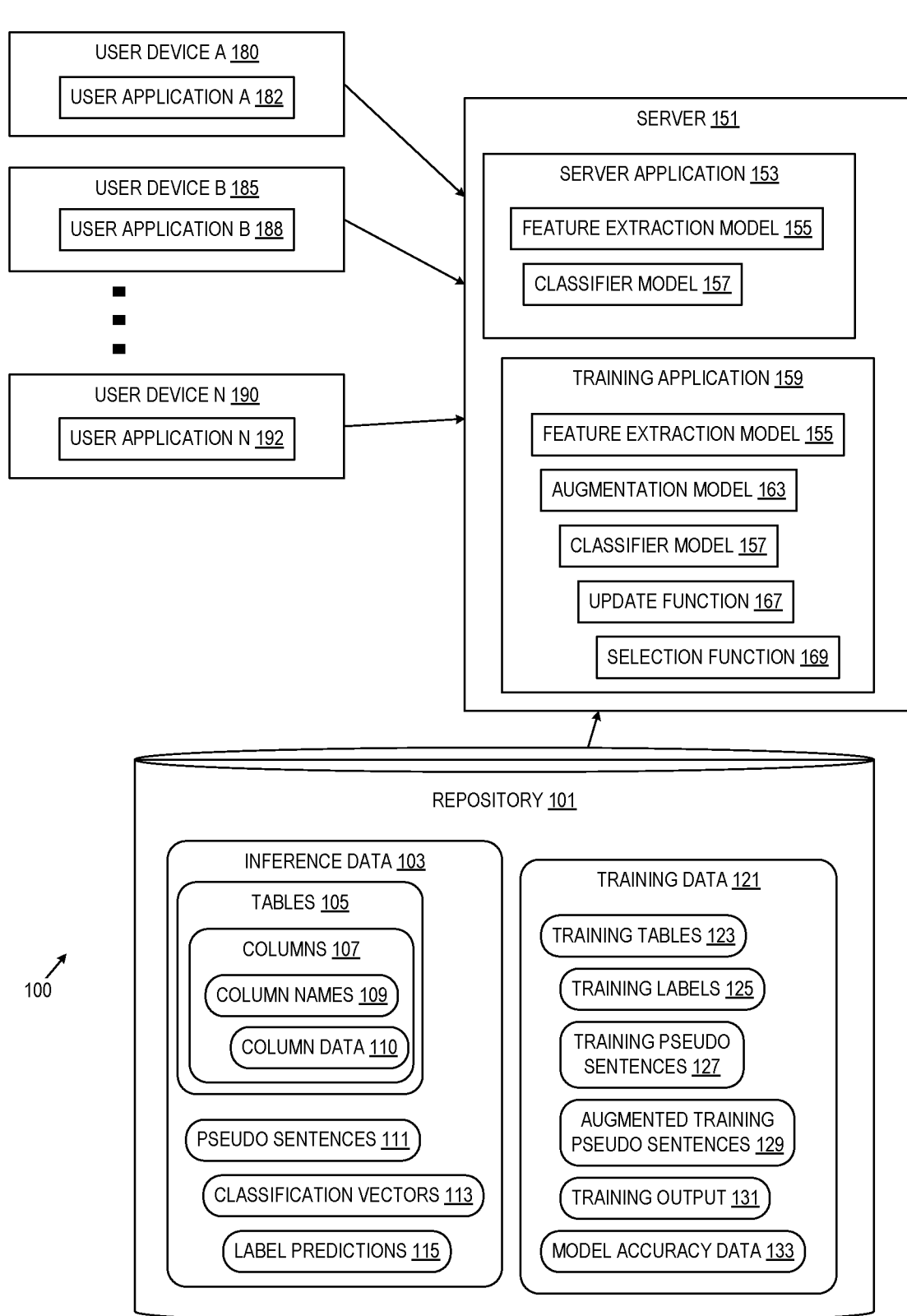

Turning to FIG. 1, the system (100) is a computing system shown in accordance with one or more embodiments. The system (100) and corresponding components may utilize the computing systems described in FIG. 10.1 and FIG. 10.2 to develop and implement machine learning framework for extraction. Different architectures may be used. The system (100) includes the repository (101), the server (151), and the user devices A (180) and B (185) through N (190).

The repository (101) is a type of storage unit and/or device (e.g., a file system, database, data structure, or any other storage mechanism) for storing data. The repository (101) may include multiple different, potentially heterogeneous, storage units and/or devices. The repository (101) stores data utilized by other components of the system (100). The data stored by the repository (101) includes the inference data (103) and the training data (121).

The inference data (103) is data generated by the system (100) during inference, e.g., during the usage of the classifier model (157) to predict the data types of the tables (105). The inference data (103) includes the tables (105), the pseudo sentences (111), the classification vectors (113), and the label predictions (115).

The tables (105) are data structures that store information used by the system (100). Information in the tables (105) may be stored using rows and columns and include well data captured at a well site. Each of the tables (105) may correspond to a data type. For example, a set of the tables (105) may correspond to a marker data type and another set of the tables (105) may correspond to a well header data type. The tables (105) include the columns (107) and one table may include multiple columns.

The columns (107) store data within the tables (105). A column stores data values within cells within the column. Each of the columns (107) includes one of the column names (109) and a set of the column data (110).

The column names (109) are the names of the columns (107). The column names (109) may be stored as string values in the header rows of the tables (105).

The column data (110) are the values of data stored within the columns (107). Each column may have multiple values. The values may be characters, numbers, strings, etc.

The pseudo sentences (111) are sets of appended features that include features extracted from the tables (105). For example, one of the pseudo sentences (111) may be generated by appending a set of the column names (109) from one of the tables (105) together into a string. As another example, one of the pseudo sentences (111) may be generated by extracting the column data (110) for each of the columns (107) into a set of feature vectors that are appended together. One of the feature vectors may include data (features) extracted from one of the columns (107). The data that is extracted may include values copied from a column, normalized values from a column, metrics generated from the data from a column, etc.

The classification vectors (113) are outputs of the classifier model (157). The classification vectors (113) are generated from the pseudo sentences (111). In an embodiment, a classification vector includes multiple values with each value corresponding to a label for a data type to identify the type of data in a table.

The label predictions (115) are predictions of the labels for the tables (105). The label predictions (115) may be generated with the classifier model (157) from the classification vectors (113).

The training data (121) is the data used by the system (100) to train the classifier model (157). The training data includes the training labels (125), the training pseudo sentences (127), the augmented training pseudo sentences (129), and the training output (131), and the model accuracy data (133).

The training tables (123) are tables used to train the classifier model (157). Like the tables (105), the training tables (123) store information in rows and columns and include a header row with column names as well as column data within the columns. The training tables (123) may be historical tables previously received by the system (100).

The training labels (125) are labels for the training tables (123) that identify the data type of the training tables (123). In an embodiment, the data type of a table may be stored as a string that semantically identifies the type of data in the table. For example, the strings "Marker", "Well Header", "Trajectory", etc., may identify tables for different types of well data. The training labels (125) may have a one to one correspondence with the training tables (123). In an embodiment, the training labels may include corrections provided by users of the system (100).

The training pseudo sentences (127) are pseudo sentences, as described above, used to train the classifier model (157). The training pseudo sentences (127) may be generated from the column names and the column data of the training tables (123).

The augmented training pseudo sentences (129) are additional pseudo sentences generated from the column names and column data of the training tables (123) for training the classifier model (157). The augmented training pseudo sentences (129) may differ from the training pseudo sentences (127) to include perturbations by sampling and/or shuffling the features in a training pseudo sentence generated from one of the training tables (123). A set of multiple training pseudo sentences (127) may be generated from one of the training tables (123). In an embodiment, each of the training pseudo sentences (127) may correspond to a set of the augmented training pseudo sentences (129), correspond to one of the training tables (123), and correspond to one of the training labels (125).

The training output (131) is the output from the classifier model (157) during training. In an embodiment, the training output (131) may include a classification vector. In an embodiment, the training output (131) may be a scalar value that identifies the similarity between two classification vectors.

The model accuracy data (133) is data that identifies the accuracy of the output of a model. The model accuracy data (133) may include the accuracy of multiple versions of the classifier model (157) from which the most accurate model may be selected.

Continuing with FIG. 1, the system (100) also may include the server (151). The server (151) is one or more computing systems, possibly in a distributed computing environment. An example of the server (151) may be the computing system shown in FIG. 10.1.

The server (151) may host and execute one or more processes, software, applications, etc. For example, the server (151) may execute one or multiple instantiations of the training application (159) and the server application (153) using different computing systems and servers. The server (151) may interact with the user devices A (180) and B (185) through N (190) to implement an extraction machine learning framework.

The server application (153) is a collection of programs operating on the server (151). The server application (153) uses the feature extraction model (155) and the classifier model (157) to process the tables (105) and create the label predictions (115).

The feature extraction model (155) in the server application (153) is a copy or version of the feature extraction model (155) in the training application (159). The feature extraction model (155) is configured to process the tables (105) to create the pseudo sentences (111). In an embodiment, the feature extraction model (155) may extract features that include names and data from the columns (107) as features that are then appended together to generate the pseudo sentences (111).

The classifier model (157) is a machine learning model that generates the classification vectors (113) and the label predictions (115). The classifier model (157) is a copy or version of the classifier model (157) in the training application (159) after at least some training is performed. The classifier model (157) is configured to process the pseudo sentences (111) to create the classification vectors (113) from which the label predictions (115) are identified. In an embodiment, the classifier model (157) may be a neural network model incorporating multiple layers. The classifier model (157) may include weights and parameters that are applied to the inputs to generate the outputs of the classifier model (157).

The training application (159) is a collection of programs operating on the server (151). The training application (159) uses the feature extraction model (155), the augmentation model (163), the update function (167), and the selection function (169) to train the classifier model (157) with the training data (121).

The feature extraction model (155) may be the same as that used by the server application (153). The feature extraction model (155) processes the training tables (123) to extract the training pseudo sentences (127) from the training tables (123).

The augmentation model (163) augments the training data (121) by increasing the amount of training data beyond the training pseudo sentences (127) to include the augmented training pseudo sentences (129). The augmentation model (163) processes the training tables (123) to create the augmented training pseudo sentences (129). The augmentation model (163) may sample and shuffle the column names and column data from the training tables (123), which are then appended together, to create the augmented training pseudo sentences (129).

The classifier model (157) is a machine learning model trained by the training application (159). The classifier model (157) is trained to identify the data type of a table by outputting a classification vector from which a label prediction may be identified. In an embodiment, the classifier model (157) may be trained on pseudo sentences that are strings generated from the column names of the training tables (123). In an embodiment, the classifier model (157) maybe trained on pseudo sentences that are sets of feature vectors that include data extracted from the column data of the training tables (123). In an embodiment, the system (100) may use multiple classifier models. The classifier models may include at least one classifier model trained on sentences from column names and at least one classifier model trained on feature vectors extracted from column data.

The update function (167) is a function that updates the classifier model (157) during training. The update function (167) processes the training output (131) to create updates for the classifier model (157). The updates may change values for the weights and parameters of the classifier model (157) to increase the accuracy of the classifier model (157).

In an embodiment, the update function (167) uses a Siamese algorithm to generate two outputs corresponding to two inputs (i.e., two input pseudo sentences) that have the same or different label. The update function (167) calculates the error between the two outputs and backpropagates the error through the classifier model (157) to update the values of the weights and parameters of the classifier model (157).

In an embodiment, the update function (167) may use supervised learning to compare the output from the classifier model with a training label that corresponds to the input. The error between the output and the training label may then be backpropagated through the classifier model (157) to update the values of the weights and parameters of the classifier model (157).

The selection function (169) is a program that selects a version of the classifier model (157) for deployment based on the model accuracy data (133). In an embodiment, the selection function (169) may select the version of the classifier model (157) with accuracy greater than the other versions.

Continuing with FIG. 1, the user devices A (180) and B (185) through N (190) may interact with the server (151). The user devices A (180) and B (185) through N (190) may be computing systems in accordance with FIG. 10.1 and FIG. 10.2. The user devices A (180) and B (185) through N (190) may include and execute the user applications A (182) and B (188) through N (192).

In one or more embodiments, the user device A (180) is operated by a user to operate the training application (159) to generate and maintain the classifier model (157) and update the training data (121). Responsive to the user, the user device A (180) may interact with the server (151) to identify corrections to the training labels (125). The system (100) may also receive labels that identify new data types for which the model was not previously trained. The system may retrain the classifier model (157) with the updates to the training data (121) that includes the corrections to the training labels (125).

In one or more embodiments, the user device N (190) is operated by a user to process information from the server application (153). The user device N (190) may supply the inference data (103) to the server application (153). For example, a user may provide the tables (105) that are processed by the system (100) to generate the label predictions (115). The label predictions (115) may be presented back to the user device N (190). The user device N (190) may receive and display the label predictions (115).

Although described within the context of a client server environment with servers and user devices, aspects of the disclosure may be practiced with a single computing system and application. For example, a monolithic application may operate on a computing system to perform the same functions as one or more of the applications executed by the server (151) and the user devices A (180) and B (185) through N (190).

The use of the term table in the present application corresponds to the standard definition as used in the art to refer to a logical structure having at least two axis (i.e., row axis and column axis). The term, table, does not connote a specific underlying physical storage layout of the data unless expressly claimed. Further, the use of the term "rows" and "columns" correspond to a first axis and a second axis of the table, whereby the columns may be the first axis or transposed onto the second axis without departing from the scope of the claims.

FIG. 2.1 and FIG. 2.2 illustrate the server application (201) and the training application (251) that utilize and train the classifier model (213). The server application (201) and the training application (251) may be embodiments of the server application (153) of FIG. 1 and the training application (159) of FIG. 1.

Turning to FIG. 2.1, the server application (201) receives the table (203), which includes the columns (205), which include the column names (207) and the column data (208). The table (203) is input to the feature extraction model (209).

The feature extraction model (209) processes the table (203) to extract features from the columns (205). The features may include one or more of the column names (207) and the column data (208). The features are appended. When the features include the column names (207), the features may be appended with a white space character (e.g., a space " " character) to form the pseudo sentence (211). In an embodiment, a period may also be appended to the last column name to form the pseudo sentence (211). When the features include feature vectors with values from the column data (208), the features may be appended by joining the data structures of the feature vectors. The pseudo sentence (211) is input to the classifier model (213). In one or more embodiments, when the pseudo sentence (211) includes the column names (207), the pseudo sentence (211) may appear as a natural language sentence that is grammatically incorrect.

The classifier model (213) processes the pseudo sentence (211) to create the classification vector (219) and the label prediction (221). The classifier model (213) includes the vectorization layers (215) and the classification layers (217). The vectorization layers (215) process the pseudo sentence (211) to generate vectors that may be input to the classification layers (217). The vectorization layers (215) may be different for different types of classifier models.

In an embodiment, the vectorization layers (215) may include a language model that processes the pseudo sentence (211) when the pseudo sentence (211) is a string that includes the column names (207). The language model and its corresponding layers may be a part of the classifier model (213). In an embodiment, the layers of the language model may be part of a language model that is pretrained. The language model layers may include an embedding layer that converts tokens from the pseudo sentence (211) to word vectors. A token is a group of one or more characters from the pseudo sentence (211) that may form part of one or more words from within the pseudo sentence (211). The word vectors may be processed by transformer layers within the language model layers to generate an output of the vectorization layers (215).

In an embodiment, the vectorization layers (215) may include an encoder that processes the pseudo sentence (211) when the pseudo sentence (211) includes appended feature vectors generated from the column data (208). The encoder and its corresponding layers may be part of the classifier model (213). The encoder layers may include one or more hidden layers between an input layer and an output layer.

In an embodiment, the output from the output layer of the encoder may have the same structure and dimensions as the output from a language model when the language model is used in the vectorization layers (215). Having the same structure and dimensions for the outputs of the encoder and the language model in the vectorization layers (215) allows for the use of the same classification layers (217) regardless of whether the language model or the encoder is used to process these pseudo sentence (211) with the vectorization layers (215). Additionally, the outputs from the encoder and the outputs from the language model may be compared and used to train the encoder to have outputs in the same space as the outputs of the language model.

The classification layers (217) process the output of the vectorization layers (215) to generate the classification vector (219). In an embodiment, the classification layer may include one or more hidden layers that are connected between the output from the vectorization layers (215) to the output layer of the classification layers (217). The classification layers (217) may convert the output from the vectorization layers (215) from a semantic space in which similarly valued points have similar linguistic meaning to a classification space that identifies the data type of the table (203).

The classifier model (213) may generate the label prediction (221) from the classification vector (219). In an embodiment, the element of the classification vector (219) with the greatest value may identify the data type of the table (203) to form the label prediction (221). In an embodiment, the label prediction (221) may be a natural number that numerically identifies the data type of the table (203). The natural number may be mapped to a string value that forms the label for the table (203).

Turning to FIG. 2.2, the training application (251) trains the classifier model (213) with the training tables (253). The training tables (253) correspond to the training labels (255), which identify the data types of the training tables (253). The training application (251) processes the training tables (253) with the feature extraction model (257) and the augmentation model (261).

The feature extraction model (257) extracts the training pseudo sentences (259) from the training tables (253). Each of the training pseudo sentences (259) correspond to one of the training labels (255).

The augmentation model (261) creates the augmented training pseudo sentences (263) from the training tables (253). One of the training tables (253) and its corresponding training label (255) may correspond to one of the training pseudo sentences (259) and correspond to a set of multiple augmented training pseudo sentences (263).

The classifier model (213) receives the training pseudo sentences (259) and the augmented training pseudo sentences (263) to generate the training output (267). The training output (267) is processed by the update function (269).

The update function (269) processes the training output (267) with the training labels (255) to generate updates for the classifier model (213). The updates are applied to the classifier model (213).

The selection function (271) selects the version of the classifier model (213) for deployment. The selection function (271) processes model accuracy data to identify the version with accuracy greater than the other versions. Once the version is selected, the classifier model (213) may be deployed for use by the sever application (201) of FIG. 2.1.

Turning to FIG. 3, the process (300) implements a framework for extraction using machine learning. The process (300) includes multiple steps that may execute on the components described in the other figures, including those of FIG. 1 and FIG. 10.1. In one embodiment, a system may include at least one processor and an application that, when executing on the at least one processor, performs the process (300). In one embodiment, a non-transitory computer readable medium may include instructions that, when executed by one or more processors, perform the process (300).

Block 302 includes extracting a set of features from a table. In an embodiment, the features may include column names extracted from a header row of the table into a list of column names. In an embodiment, the features may include feature vectors with values generated or copied from the column data from the columns of the table. A feature vector may be extracted for each column of the table. A feature vector may include values copied from or generated from a column. The generated values may include metrics, which may include, means, medians standard deviations, etc.

Block 305 includes applying a feature extraction model to the set of features to generate a pseudo sentence. In an embodiment, the pseudo sentence extraction model may append the features together with a separation character to form a single string from the strings of the column names in the features extracted from the columns of the table.

Block 308 includes applying a classifier model to the pseudo sentence to generate a label prediction for the table. In an embodiment, the classifier model includes vectorization layers and classification layers.

In an embodiment, the vectorization layers includes a language model. The pseudo sentence may be converted to tokens that are converted to vectors input to an embedding layer of the language model of the vectorization layers.

In an embodiment, the vectorization layers include an encoder model. The encoder model converts the feature vectors of the pseudo sentence into vectors suitable for the classification layer.

The output of the vectorization layers is input to the classification layers. The classification layers output a classification vector. The classification vector includes a set of values in which each value corresponds to one data type. The system identifies the label prediction as the data type that corresponds to the greatest value from the values of the classification vector. In an embodiment, the classifier model is trained with an augmented training pseudo sentence created by one or more of sampling and shuffling.

Block 310 includes updating a label of the table with the label prediction. The label that identifies the data type of the table is updated with the label prediction. In an embodiment, the label prediction may be an integer value that is mapped to a string value that semantically identifies the data type of the table.

In an embodiment, the process (300) may further include additional operations to train the classifier model with an augmented training pseudo sentence. The operations for training with the augmented training pseudo sentence may include extracting a set of training features from a training table. In an embodiment, the training features may include column names extracted from the header row of the training table.

The operations for training with the augmented training pseudo sentence may further include sampling the set of training features to create a set of sampled features. Sampling may be performed by dropping one or more of the features (e.g., column names) extracted from the table (e.g., from a header row of the table) to create set of sampled features. For example, a table with the column names "WellID", "WellName", "WellType", and "WellStatus" may have one of the column names removed to form the sets of sampled features:

"WellID", "WellName", and "WellType";
"WellID", "WellName", and "WellStatus";
"WellID", "WellType", and "WellStatus"; and
"WellName", "WellType", and "WellStatus".

More than one of the features (e.g., more than one column name) may be removed to further increase the number of sets of sampled features.

When the set of training features includes feature vectors, one or more of the feature vectors may be removed from the set of training features to create a set of sampled features. Multiple sets of sampled features may be created.

The operations for training with the augmented training pseudo sentence may further include shuffling one or more of the set of training features and the set of sampled features to create a set of augmented features. Continuing the example above, the original set of features with four column names may have the column names shuffled into four factorial ("4!") or 24 different sequences. Each of the sampled lists may be shuffled into three factorial ("3!") or 9 different sequences yielding a total of 24+9*3=51 different lists with similar features (e.g., column names) that correspond to the same label identifying the same data type. When feature vectors are used, the ordering of the feature vectors in the set of feature vectors may be shuffled to generate multiple sets of augmented features.

More than one features (e.g., column name) may be dropped, so the previous example of creating 51 samples is for illustration purposes. Further, the dropping of columns may be performed using weights. The weights may be obtained from domain experts or based on metrics (e.g., average number of times a column name appears in a data set). The weights may identify the likelihood that a column is dropped when augmenting the data. Certain columns may be used in retraining more often, which may correspond to a lower weight, e.g., 0.0 to 0.1 indicating that the column is dropped 0% to 10% of the time. Other columns may be dropped more frequently and have higher weights, e.g., 0.5 to 1.0, indicating that the column may be dropped 50% to 100% of the time. Weights with different values beyond those identified here may be used.

The operations for training with the augmented training pseudo sentence may further include applying the feature extraction model to the set of augmented features to create the augmented training pseudo sentence. With features that are column names, the column names may be appended with a separator character to form the pseudo sentence. For example, the column names from the original list "WellID", "WellName", "WellType", and "WellStatus" may be appended together with the space (" ") separator to form the pseudo sentence "WellID WellName WellType WellStatus".

In an embodiment, the process (300) may further include retraining the classifier model to create a retrained classifier model. The retraining may be performed after receiving corrections from a user of the system to identify proper labels for tables processed by the system. The user may also provide additional labels that were not used during previous training of the classifier model.

In an embodiment, the process (300) may further include retraining the classifier model with a set of training tables with new training labels corresponding to a new data type identified by a user. The new training labels may correspond to less than ten percent the training data used to train the classifier model. For example, the new training labels may be identified for 1, 10, 100, 1000 training tables, which may be less than ten percent of more than 10,000 training tables used to train the classifier model. Even with few new training tables with corresponding labels, a large amount of augmented data can be created using random shuffling and dropping. The use of augmented data generated from the few new examples of the training labels reduces the user effort in collecting and labelling new training tables for the new data type.

In an embodiment, the process (300) may further include selecting one of the classifier model and the retrained classifier model to deploy. The selection may use a processor to compare an accuracy of the classifier model stored to a memory with an accuracy of the retrained classifier model that is also stored to the memory. The model with the higher accuracy may be selected for deployment.

In an embodiment, the process (300) may further include additional operations for training the classifier model. The operations for training the classifier model may include applying the feature extraction model to a set of training tables to create a set of training pseudo sentences.

The operations for training the classifier model may further include applying an augmentation model to the set of training tables to create a set of augmented training pseudo sentences. The augmentation model may sample and shuffle the features to increase the amount of training data for the classifier model being trained.

The operations for training the classifier model may further include applying the classifier model to the set of training pseudo sentences and the set of augmented training pseudo sentences to create a set of training outputs. Training the classifier model with the training pseudo sentences and with the augmented training pseudo sentences may increase the accuracy of the classifier model.

The operations for training the classifier model may further include applying an update function to the set of training outputs to create updates to the classifier model. The update function identifies an amount of error generated by the model and uses the error to generate the updates for the weights and parameters of the classifier model.

The operations for training the classifier model may further include updating the classifier model by applying the updates to the classifier model. The updates may be added to current values of the weights and parameters to update the classifier model.

In an embodiment, the process (300) may further include additional operations for operation of the feature extraction model. The operations may include appending a separation character to a first column name from the set of features. The operations may further include appending a second column name, from the set of features, to the separation character. The appending of separator characters and column names may repeat to append each of the column names from the set of features into a single string to form the pseudo sentence.

In an embodiment, the process (300) may further include operations performed by the classifier model. Operations of the classifier model may include applying vectorization layers of the classifier model to the pseudo sentence to create an output of the vectorization layers. Operations of the classifier model may further include applying classification layers of the classifier model to the output of the vectorization layers to create a classification vector. Operations of the classifier model may further include selecting an element from the classification vector to create the label prediction.

In an embodiment, the process (300) may further include receiving, via a graphical user interface (GUI), a label correction for the label prediction. The system provides a one click solution for retraining, adding new data types, etc. The graphical user interface may be displayed on a user device that receives the label correction. The label correction may identify a different data type for a table than the label prediction generated by the classifier model. The label correction may be stored by the system.

In an embodiment, the process (300) may further include retraining the classifier model with a set of label corrections. The label corrections may include new data types.

In an embodiment, the process (300) may further include clustering a set of classification vectors generated with the classifier model and stored in a memory. The set of classification vectors stored in the memory are clustered to create a set of clusters corresponding to a set of labels. The set of labels may include the label of the table that is updated with the label prediction. The clusters may be used to identify the prediction label for a classification vector.

In an embodiment, the process (300) may further include detecting an incorrect label with a label value corresponding to a classification vector within a cluster, of a set of clusters, that does not correspond to the label value. The incorrect label may have been provided by a user during retraining. For example, a user may incorrectly enter a correction for a label for a table. Each label may correspond to a cluster. The system may further identify the cluster that corresponds to the classification vector generated from the table. If the cluster for the classification vector does not match the label entered by the user, the system may identify the label entered by the user as an incorrect label and remove the corresponding table from the training data used for retraining to prevent retraining the classifier model with incorrect data.

Turning to FIG. 4.1, FIG. 4.2, FIG. 4.3, and FIG. 4.4, the tables (401) and (405) are spread across FIG. 4.1, FIG. 4.2, FIG. 4.3, and FIG. 4.4. The tables (401) and (405) include the header rows from several other tables of well data. The tables (401) and (405) show examples of two data types "Marker" for the label (403) and "Well Header" for the label (407). Each data type has a different data format of files. The rows in the tables (401) and (405) may correspond to individual file formats. For example, a row in the table (401) may correspond to the header in the file that lists the attributes in the file. For simplicity, the values (e.g., data after the header) is not shown. Each row refers to different attributes/columns present in the corresponding tabular file. For example, in the table (401), each row may correspond to the column names (features) of a table with a data type identified as "Marker" in a corresponding particular comma separated value (CSV) file. Because the format (including the column names) may be different between files, data extraction techniques may have difficulty in identifying that multiple files correspond to the same data type. Further, columns in different files of the same data type may be missing, in different orders, or have different names.

One or more embodiments may also address issues with limited sample sets of files. As shown in FIG. 4.1, FIG. 4.2, FIG. 4.3, and FIG. 4.4, the marker data type has 5 examples while the well header data type has 10 examples.

Figure 5:
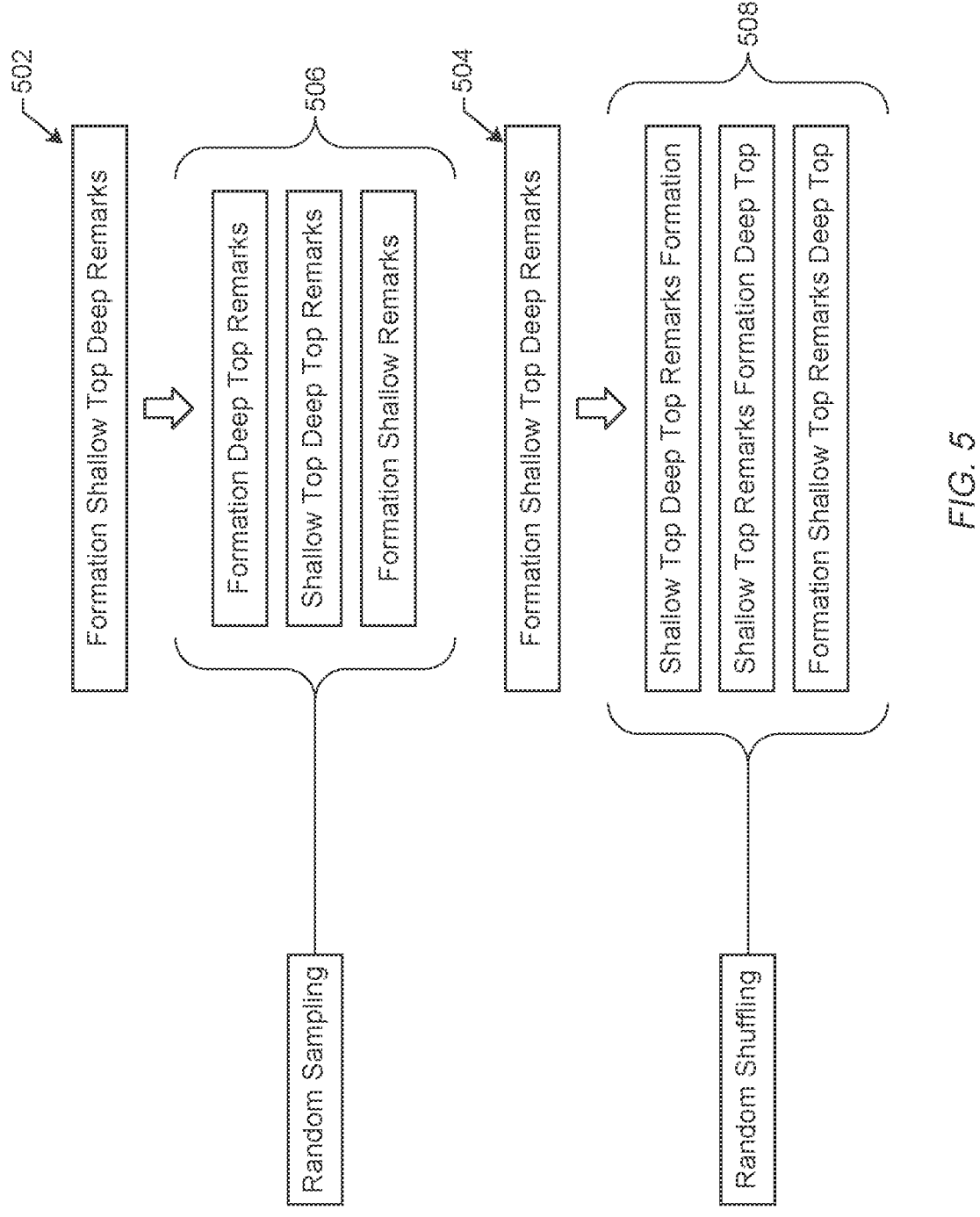
FIG. 5 shows an example of sample perturbation in accordance with one or more embodiments.

Turning to FIG. 5, data perturbations may be performed to create additional samples of data. The perturbations may be performed with random sampling, random shuffling, etc. FIG. 5 shows an example of generating many samples from one sample of tabular data. The sequence of words is the list of column names (features) from a tabular data file.

In FIG. 5, the first element (502) and (504) of FIG. 5 shows the list of words. Random sampling selects subsets of words to create new samples as shown in the boxes (506). Shuffling moves the data around so that the columns are in different orders as shown in boxes (508). In the present application, the boxes (506) and (508) correspond to different headers of files of tabular data that correspond to the same data type.

Figure 6:
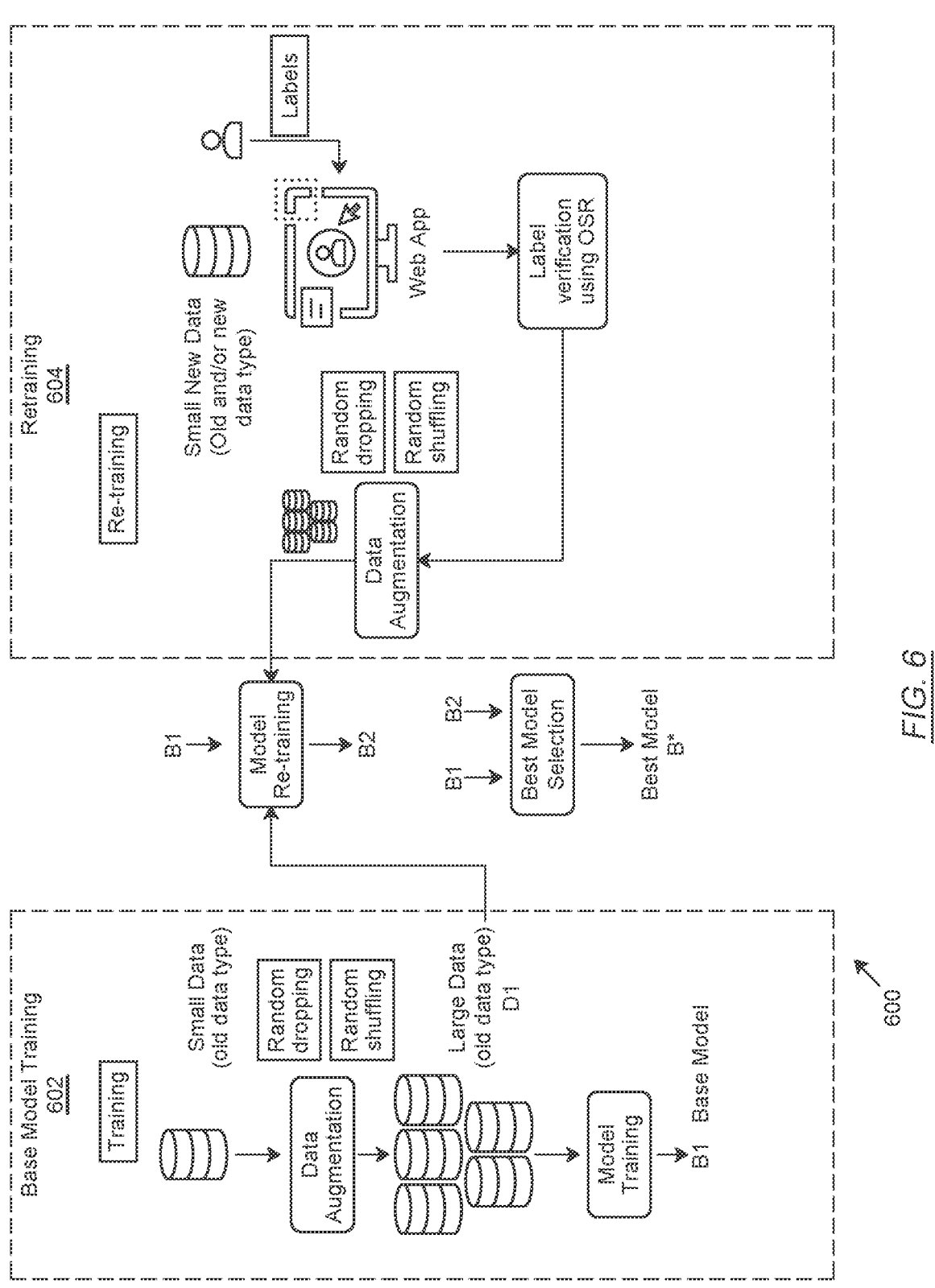
FIG. 6 shows a diagram of one or more embodiments.

Turning to FIG. 6, the framework (600) may be used for model training, retraining, and best model selection strategy for tabular data files. The framework (600) may be a web based framework that performs data type separation, relabeling, correction for old data type samples, labeling of samples for new data types, retraining of machine learning models, best model selection strategy, etc.

During base model training (602), based on availability of very few samples, data augmentation (e.g., random shuffling and dropping of columns of tabular data as described in FIG. 5) is used to create large data D1 for the machine learning model. A natural language programming based classifier model (B1) is trained which takes a pseudo sentence (a sequence of features extracted from a table, which may be column names or feature vectors) and its label as an input data-label pair. For example, the model may include a transformer model.

During testing, a user can test (i.e., separate data files belonging to the existing data types). As another example, retraining may be performed. When retraining is performed (604), there is a possibility that the data types are old, but the samples are new. For example, a machine learning model initially trained on Marker and Well header. In the example, a new sample is added that has not been seen by the model. In this case, there is a new file that has a new source of data, and the new source of data is either a marker or a well header.

In another example, retraining may be performed because a new data type is added. For example, the new data type of trajectory is added to the existing data types of marker and well header. The user can prompt a machine learning model for retraining for newer data types (along with old data types with/without corrected labels). The retraining may be initiated by first labeling few samples of new data types and then invoking retraining functionality (one click option) in the user interface.

Continuing with FIG. 6, label verification may be performed as part of the retraining (604). Using the Open Set Recognition (OSR) technique, the system validates the labels. The validation may be performed to reduce the likelihood of erroneous labeling of old data types to prevent retraining model with incorrect data on previous samples of old data types. After validation, the data augmentation may be performed as previously described in reference to FIG. 5.

Model retraining is performed on model B1 to generate model B2. However, the system does not automatically select model B2. The selection is based on testing the model using test data that is held out from training. The test data has the old data types (i.e., old labels). For example, the best performing model among old and newly retrained model is saved by evaluating them separately on a hold-out data set of old data types.

If B1 is still performing better than B2, then new samples are requested from the user and the process repeats with the new samples. The structure or architecture of the model does not change each time even though the weights and parameters of the model may be updated.

Turning to FIG. 7, a user may interact with the user interface (700) to select to classify the data, download the results, or retrain the data. Further, the user may enter a new data type with the interface element (702).

Turning to FIG. 8, the user interface (800) may be displayed upon selection of the interface element (702) of FIG. 7. The user interface (800) displays a set of rows with each row associated with a file name. The system predicts the data type (i.e., denoted by the label for the file). The user may select through drop down boxes, a correction for each of the labels. FIG. 8 shows another view of the user interface. As shown in FIG. 8 the system labels are based on the previously trained model. The user can provide a few labels, and then the model retrains based on the new labels.

For example, the user may add trajectory to data types of marker and well header. Trajectory is a new data type. Using the web application, the user uploads the files. The system makes the initial prediction using the existing model trained on the previously existing data type labels (i.e., data labels). Some of the labels are incorrect. The user then changes some of the labels, such as the new files.

Figure 9:
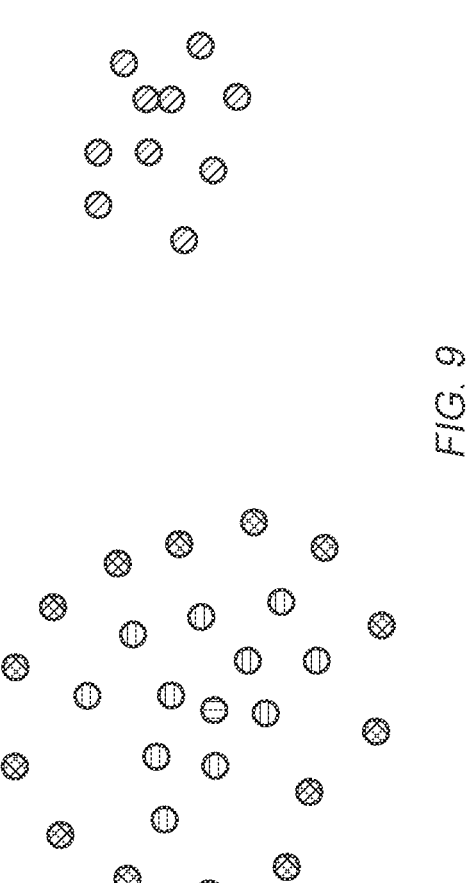
FIG. 9 shows a diagram of clustering in accordance with one or more embodiments.

FIG. 9 shows an example of a technique for label validation using OSR framework to identify such erroneous labels. In the example of FIG. 9, the blue samples are belonging to the old data types, and the green are the new data type sample. The red sample is labeled as the new data type. The OSR framework model generates vector embeddings of the headers of the files. As another example, the OSR framework model may generate a vector embedding (i.e., vector representation) of the header and the values of the file. The OSR framework model performs clustering on the vector embeddings and then adds a boundary around each of the clusters. The system generates dense cluster of in-class (old data type) samples surrounded by pseudo-open class (new class) samples. Samples which are incorrectly labeled as belonging to old data type are likely to fall inside one of the old data type clusters while true new data type samples are likely to fall outside the periphery (pseudo-open class) of the in-class cluster for each old data type. Thus, an incorrectly labeled new data type sample may be inside the cluster boundary. The system thus identifies the incorrectly labeled new file.

One or more embodiments exhibit the following features. First, one or more embodiments perform automation: Automatic data ingestion process includes the automatic detection of the data type. Manual detection is cumbersome and time consuming and it leads to productivity loss and manual error. Second, one or more embodiments is scalable. A major challenge in the data type detection is scaling it to different data types from time to time. The proposed AI/ML (artificial intelligence/machine learning) based framework provides an efficient way for data type detection across thousands of documents in quick time, thus reducing human hours. The proposed data type separation framework can be readily scaled to accommodate newer data types by retraining ML models using fewer samples and proposed data augmentation techniques. Moreover, the proposed framework automatically identifies the best performing ML model from the pool of many models. Additionally, label error detection or correction may be performed. Thus, the proposed framework may reduce the time in data ingestion. The proposed solution may help to detect data types available in the document in a meaningful way. This service may help to finalize the documents for which the user is interested.

The proposed ingestion of tabular data can be extended to different data formats such as text data, images, etc. A unified data ingestion framework can benefit from automated retraining and best model selection strategy.

As described above, one or more embodiments provide a solution for automatic data type detection and separation for data ingestion using natural language processing techniques. Furthermore, the one or more embodiments provides framework for model training using fewer labeled samples, an efficient framework for model retraining for newly inducted data types, and mechanism for storing the best performing ML model amongst many ML models created by retraining.

One or more embodiments address these challenges by using a machine learning technique that increases the training data set through sample perturbation to create new samples. Further, one or more embodiments identify erroneous labels and handles retraining. Specifically, one or more embodiments focuses on data type separation for automatic data ingestion by creating natural language programming based model, model retraining, and strategy for identifying the best performing model, respectively, by 1) generating large training data from limited training data using novel data augmentation processed, 2) overcoming the challenges associated with ML model retraining when new data type is introduced, 3) storing the best performing model amongst many machine learning models created by multiple retraining scenarios, and 4) performing label error detection and correction, as described below.

For example, one or more embodiments may be used in structured tabular data, where the structure is based on the data types of the data. Each data type may have multiple formats. The formats may define the attributes in the file. For example, a company may have three types of data: data type A, data type B, and data type C. The different types may be for different physical objects, equipment, or other entity being represented by the file. A file for a data of a datatype A may have multiple formats. Each of the multiple formats may have different columns with different column names and different column data. The various files may be intermixed with each other, such that the location of the file within a file system or repository does not indicate the file format or the data object.

One or more embodiments may generate large training data from limited data. Tabular data may have the following features: A) The order of columns (attributes) may be arbitrary. B) For data coming from various sources, it is likely that the tables for the same data type may have different columns. Based on the above facts, one or more embodiments generate large training samples (tabular data/tables) from a given table by performing random dropping of columns of the table and random shuffling of order of columns of the table (FIG. 2). To use NLP based technique for text processing, one or more embodiments create pseudo sentences formed by the sequences of the features (e.g., column names (attributes) or feature vectors) extracted from data files.

One or more embodiments may implement efficient machine learning model retraining framework. One or more embodiments provide a framework for retraining of natural language programming based machine learning model for data type classification where, the machine learning model may be easily retrained for old and new data types using fewer labeled samples (using data augmentation strategy, above) of new data type and providing for correction for the misclassified data. In one or more embodiments, the user interface presents retraining and label correction tasks are a single click process.

One or more embodiments may implement robust deployment of machine learning models. As retraining of ML model with new data belonging to old and new data type results in new ML models, the best model should be identified in case the model is trained using erroneously labeled data. In case of erroneous labeling of new samples of old data types, the best model can be identified by evaluating the current and newly trained model on the held-out data of old data types. Further, in some cases the user may be wrong in providing a label. One or more embodiments identify incorrect labeling where new samples of old data type are labeled as belonging to new data types using Open Set Recognition (OSR) framework.

Embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10.1, the computing system (1000) may include one or more computer processors (1002), non-persistent storage (1004), persistent storage (1006), a communication interface (1012) (e.g., Bluetooth interface, infrared interface, network interface, optical interface, etc.), and numerous other elements and functionalities that implement the features and elements of the disclosure. The computer processor(s) (1002) may be an integrated circuit for processing instructions. The computer processor(s) may be one or more cores or micro-cores of a processor. The computer processor(s) (1002) includes one or more processors. The one or more processors may include a central processing unit (CPU), a graphics processing unit (GPU), a tensor processing units (TPU), combinations thereof, etc.

The input devices (1010) may include a touchscreen, keyboard, mouse, microphone, touchpad, electronic pen, or any other type of input device. The input devices (1010) may receive inputs from a user that are responsive to data and messages presented by the output devices (1008). The inputs may include text input, audio input, video input, etc., which may be processed and transmitted by the computing system (1000) in accordance with the disclosure. The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the output devices (1008) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms. The output devices (1008) may display data and messages that are transmitted and received by the computing system (1000). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure, which may include transmitting, receiving, presenting, and displaying data and messages described in the other figures of the disclosure.

The computing system (1000) in FIG. 10.1 may be connected to or be a part of a network. For example, as shown in FIG. 10.2, the network (1020) may include multiple nodes (e.g., node X (1022), node Y (1024)). Each node may correspond to a computing system, such as the computing system shown in FIG. 10.1, or a group of nodes combined may correspond to the computing system shown in FIG. 10.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10.1. Further, the client device (1026) may include and/or perform all or a portion of one or more embodiments of the disclosure.

The computing system of FIG. 10.1 may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method, comprising:
extracting a set of features from a table;
applying a feature extraction model to the set of features to generate a pseudo sentence;
applying a classifier model to the pseudo sentence to generate a label prediction for the table, the classifier model being trained with an augmented training pseudo sentence, the classifier model comprising a neural network model comprising a plurality of layers, the plurality of layers including a plurality of vectorization layers comprising at least one of: a language model comprising at least an embedding layer and a transformer layer or an encoder comprising at least one or more hidden layers, to process the pseudo sentence and generate at least one classification vector, the classifier model being trained with the augmented training pseudo sentence created by:
extracting a set of training features from a training table;
sampling the set of training features to create a set of sampled features;
creating a set of augmented features by:
shuffling one or more of the set of training features or the set of sampled features; and
dropping at least one of the one or more of the set of training features or the set of sampled features, the dropping being performed using weights identifying a likelihood that a feature is dropped; and
applying the feature extraction model to the set of augmented features to create the augmented training pseudo sentence; and
updating a label of the table with the label prediction.

2. The method of claim 1, further comprising:
retraining the classifier model to create a retrained classifier model; and
selecting one of the classifier model and the retrained classifier model to deploy using a processor to compare an accuracy of the classifier model stored to a memory with an accuracy of the retrained classifier model stored to the memory.

3. The method of claim 1, wherein training the classifier model comprises:
applying the feature extraction model to a set of training tables to create a set of training pseudo sentences;
applying an augmentation model to the set of training tables to create a set of augmented training pseudo sentences;
applying the classifier model to the set of training pseudo sentences and the set of augmented training pseudo sentences to create a set of training outputs;
applying an update function to the set of training outputs to create updates to the classifier model; and
updating the classifier model by applying the updates to the classifier model.

4. The method of claim 1, wherein operation of the feature extraction model includes:
appending a separation character to a first column name from the set of features; and
appending a second column name, from the set of features, to the separation character.

5. The method of claim 1, wherein operation of the classifier model includes:
applying vectorization layers of the classifier model to the pseudo sentence to create an output of the vectorization layers;
applying classification layers of the classifier model to the output of the vectorization layers to create a classification vector; and
selecting an element from the classification vector to create the label prediction.

6. The method of claim 1, further comprising:
receiving, via a graphical user interface (GUI), a label correction for the label prediction.

7. The method of claim 1, further comprising:
retraining the classifier model with a set of label corrections.

8. The method of claim 1, further comprising:
clustering a set of classification vectors stored in a memory and generated with the classifier model,
wherein the set of classification vectors stored in the memory are clustered to create a set of clusters corresponding to a set of labels, and
wherein the set of labels comprises the label.

9. The method of claim 1, further comprising:
detecting an incorrect label comprising a label value and corresponding to a classification vector within a cluster, of a set of clusters, that does not correspond to the label value.

10. The method of claim 1, further comprising:
retraining the classifier model with a set of training tables with new training labels corresponding to a new data type identified by a user, wherein the new training labels correspond to less than ten percent of training data used to train the classifier model.

11. A system, comprising:

at least one processor; and an application, when executed by the at least one processor, performs:

extracting a set of features from a table;

applying a feature extraction model to the set of features to generate a pseudo sentence;

applying a classifier model to the pseudo sentence to generate a label prediction for the table, the classifier model being trained with an augmented training pseudo sentence, the classifier model comprising a neural network model comprising a plurality of layers, the plurality of layers including a plurality of vectorization layers comprising at least one of: a language model comprising at least an embedding layer and a transformer layer or an encoder comprising at least one or more hidden layers, to process the pseudo sentence and generate at least one classification vector, the classifier model being trained with the augmented training pseudo sentence created by:

extracting a set of training features from a training table;

sampling the set of training features to create a set of sampled features;

creating a set of augmented features by:

shuffling one or more of the set of training features or the set of sampled features; and dropping at least one of the one or more of the set of training features or the set of sampled features, the dropping being performed using weights identifying a likelihood that a feature is dropped; and applying the feature extraction model to the set of augmented features to create the augmented training pseudo sentence; and updating a label of the table with the label prediction.

12. The system of claim 11, wherein the application further performs:

retraining the classifier model to create a retrained classifier model; and selecting one of the classifier model and the retrained classifier model to deploy using a processor to compare an accuracy of the classifier model stored to a memory with an accuracy of the retrained classifier model stored to the memory.

13. The system of claim 11, wherein training the classifier model comprises:

applying the feature extraction model to a set of training tables to create a set of training pseudo sentences;

applying an augmentation model to the set of training tables to create a set of augmented training pseudo sentences;

applying the classifier model to the set of training pseudo sentences and the set of augmented training pseudo sentences to create a set of training outputs;

applying an update function to the set of training outputs to create updates to the classifier model; and updating the classifier model by applying the updates to the classifier model.

14. The system of claim 11, wherein operation of the feature extraction model includes:

appending a separation character to a first column name from the set of features; and appending a second column name, from the set of features, to the separation character.

15. The system of claim 11, wherein operation of the classifier model includes:

applying vectorization layers of the classifier model to the pseudo sentence to create an output of the vectorization layers;

applying classification layers of the classifier model to the output of the vectorization layers to create a classification vector; and selecting an element from the classification vector to create the label prediction.

16. The system of claim 11, wherein the application further performs:

receiving, via a graphical user interface (GUI), a label correction for the label prediction.

17. The system of claim 11, wherein the application further performs:

retraining the classifier model with a set of label corrections.

18. A non-transitory computer readable medium comprising instructions that, when executed by at least one processor, cause the at least one processor to perform:

extracting a set of features from a table;

applying a feature extraction model to the set of features to generate a pseudo sentence;

applying a classifier model to the pseudo sentence to generate a label prediction for the table, the classifier model being trained with an augmented training pseudo sentence, the classifier model comprising a neural network model comprising a plurality of layers, the plurality of layers including a plurality of vectorization layers comprising at least one of: a language model comprising at least an embedding layer and a transformer layer or an encoder comprising at least one or more hidden layers, to process the pseudo sentence and generate at least one classification vector, the classifier model being trained with the augmented training pseudo sentence created by:

extracting a set of training features from a training table;

sampling the set of training features to create a set of sampled features;

creating a set of augmented features by:

shuffling one or more of the set of training features or the set of sampled features; and dropping at least one of the one or more of the set of training features or the set of sampled features, the dropping being performed using weights identifying a likelihood that a feature is dropped; and applying the feature extraction model to the set of augmented features to create the augmented training pseudo sentence; and updating a label of the table with the label prediction.

* * * * *